Patented Sept. 7, 1948

2,448,952

UNITED STATES PATENT OFFICE 2,448,952

METHOD FOR OBTAINING DISPERSIONS OF POLYTETRAFLUOROETHYLENE-ETHYLENE COPOLYMERS

Kenneth L. Berry, Hockessin, Del., assignor to E. I. du Pont de Nemours & Company, Wilmington, Del., a corporation of Delaware No Drawing. Application July 26, 1945, Serial No. 607,256

2 Claims. (Cl. 260—31.8)

This invention relates to dispersions of polymeric materials and more particularly to a process for the preparation of dispersions of copolymers of tetrafluoroethylene and ethylene.

The tetrafluoroethylene/ethylene copolymers used in the practice of this invention can be obtained, for example, by heating at polymerizing temperature (40° C. to 150° C.) mixtures of tetrafluoroethylene and ethylene containing tetrafluoroethylene in major amounts under superatmospheric pressure, generally from 3 to 50 atmospheres, in the presence of water, organic solvents or mixtures of water with an organic solvent using oxygen, an organic peroxy compound, such as benzoyl peroxide, or a water soluble salt of persulfuric acid, such as ammonium persulfate, as the catalyst. These macromolecular copolymers melt at temperatures in excess of 200° C., and generally at temperatures above 240° C., and are further characterized by their nonworkability, and insolubility in common organic solvents.

While the above mentioned combination of properties is very desirable for a great many applications, these very properties make these copolymers unavailable for other uses. For many applications there are advantages in the use of solutions rather than molten compositions to achieve the fluid state necessary in lacquers, coating compositions, and dopes suitable for use in forming various objects such as films, sheets, ribbons, bristles and filaments. However, since these copolymers are soluble only at high temperature in a limited number of solvents such as neutral esters of saturated dicarboxylic acids, e. g., diisobutyl adipate, in high boiling ketones, e. g., isofenchone, and a mixture of unsaturated cyclic ketones boiling within the range of 250° to 325° C. and containing from 12 to 18 carbon atoms, the application of a solution of the above mentioned copolymers for the formation of coatings and films is obviously attended with serious difficulties because the use of such solutions is limited to elevated temperatures which cannot be maintained conveniently.

This invention has as an object a method by means of which there can be readily and economically obtained a fluid tetrafluoroethylene/ethylene copolymer dispersion which can be handled and applied at room temperature, which requires no dispersing agent, and which will give continuous, tough coatings or films upon evaporation at high temperatures. A still further object resides in the production from these dispersions of strong coatings and films. Other objects will appear hereinafter.

The above objects are accomplished by a process which comprises dissolving the tetrafluoroethylene/ethylene copolymer at elevated temperature in a liquid medium which is not a solvent for the copolymer at temperatures up to 175° C., but which becomes a solvent for the copolymer at a higher temperature, cooling the solution to the point of incipient gelation and then vigorously agitating the solution until precipitation of the copolymer is substantially complete.

In the preferred method of practicing the invention, the tetrafluoroethylene/ethylene copolymer is mixed with the solvent, the mixture is heated rapidly to the boiling point of the solvent used and maintained at that temperature until the vigorous bubbling subsides, during which period any more volatile materials, such as traces of water, are expelled, cooling the solution slowly to the point of incipient gelation, and then vigorously agitating the solution until precipitation of the copolymer is complete.

Maintenance of the temperature of the solution near the boiling point until the bubbling subsides permits a more accurate adjustment of the particle size of the copolymer in the resultant dispersion. Further, the dispersions obtained are less thixotropic than those obtained without complete removal of the water from the polymer solution. By operating in this manner, it is possible to obtain dispersions which are quite fluid and which have solids contents ranging up to approximately 50%. The dispersions made in this manner consist of particles which are approximately spherical in shape suspended in a latent, high temperature solvent. The particles have unusual uniformity of size which are in the range 0.1 to approximately 15 microns in diameter depending upon the selection of operating conditions, chiefly the duration of heat treatment of the solution. In fact, it is possible to predetermine the particle size within fairly narrow limits. Thixotropy or false body in the dispersions appears to vary somewhat with particle size, decreasing very rapidly as the particle size increases.

The dispersions obtained by the present process can be diluted with any liquid compatible with the original vehicle without coagulation. They can also be heated to the solution temperature of the polymer without causing any coagulation or aggregation of the particles. Upon heating one of these dispersions its viscosity decreases at first, increases as the particles dissolve, reaches a maximum upon complete solution of the polymer, and then decreases as the resulting solution is heated to its boiling point. The dispersions can be frozen, in Dry Ice for example, to a solid which, upon melting, yields the dispersion in its original condition. There is a tendency for the particles to settle on standing but they can be redispersed by agitating the mixture. The particles can be recovered from the dispersions by filtering or centrifuging and redispersed by stirring in any organic liquid or in water containing a suitable surface active agent.

The invention is further illustrated by the following examples in which the parts are by weight.

*Example I*

A mixture of one part of tetrafluoroethylene/ethylene copolymer having a mole ratio of tetrafluoroethylene to ethylene of 1:1.4 (71.8% tetrafluoroethylene) and 3 parts of diisobutyl adipate is placed in a vessel equipped with a stirrer and surrounded by a fused salt heat transfer bath. The temperature of the bath is raised as rapidly as possible to 290° C. At 230° C. the polymer is completely dissolved and the solution gives the appearance of boiling although the temperature is below the boiling point of diisobutyl adipate. As the temperature of the solution approaches 290° C. the bubbling subsides. The heating is then discontinued and the temperature of the solution allowed to decrease. As the temperature approaches 230° C. the solution is stirred and the temperature of the bath maintained at 230° C. until the precipitation of the copolymer from the solution is complete. The mixture is then cooled to room temperature at any convenient rate. The dispersion obtained is very fluid and is concentrated to about 40% solids by centrifuging. A portion of the dispersion is converted to a dimethyl phthalate vehicle which is a nonsolvent for the copolymer, by filtering the dispersion, washing the finely divided polymer with dimethyl phthalate until free of diisobutyl adipate and then redispersing the polymer in dimethyl phthalate by vigorous stirring at room temperature.

In coating wire with polymer applied from this dispersion, No. 28 gauge copper wire is passed through the dispersion adjusted to 34% solids concentration and then into an oven where it is baked for approximately 20 seconds at 360–365° C. This operation is repeated three more times. A smooth, glossy, adherent, tough coating of the polymer 0.0011" thick is thereby formed on the wire.

*Example II*

A mixture of one part of tetrafluoroethylene/ethylene copolymer having a mole ratio of tetrafluoroethylene to ethylene of 1:1.45 (71% tetrafluoroethylene) and 4 parts of diisobutyl adipate is stirred during heating in a transfer bath at 230° C. until solution of the copolymer is complete. Heating and stirring are continued until the bubbling of the solution subsides. The solution is then slowly cooled with vigorous agitation during which time the polymer precipitates from the solution in the form of discrete particles. There results a dispersion consisting of approximately 5–7 micron diameter particles of copolymer suspended in a latent solvent. The dispersion is concentrated by centrifuging to 37% solids to obtain a more viscous dispersion which is suitable for coating objects such as copper wire.

The process of this invention is applicable to the preparation of dispersions of tetrafluoroethylene/ethylene copolymers containing in major amount up to 85% of tetrafluoroethylene in a latent solvent. Dispersions of copolymers which consist of from 60 to 85% of tetrafluoroethylene and from 40% to 15% ethylene are particularly valuable for use in coating wires for electrical insulation purposes. This invention is best practiced with latent solvents consisting of the neutral esters of saturated dicarboxylic acids which contain at least 5 carbon atoms, said esters being free of multiple carbon to carbon linkages and containing from 7 to 18 carbon atoms. Examples of such esters are dimethyl glutarate, dimethyl adipate, diethyl adipate, diisobutyl adipate, dimethyl azelate, dibutyl sebacate, dimethyl adipate and dimethyl hexahydrophthalate. Of these the dialkyl esters of saturated acyclic hydrocarbon dicarboxylic acids are particularly valuable for the present purpose since these esters are better solvents for the polymers and, in general, yield dispersions of higher polymer concentration. Another class of latent solvents which can be used to prepare the dispersions of this invention are the high boiling ketones. Included in this class are isofenchone, acetophenone, benzophenone, isophorone and a mixture of unsaturated cyclic ketones boiling within the range of 250–325° C., and containing from 12 to 18 carbon atoms.

The temperature at which gelation occurs during the preparation of the dispersion is dependent somewhat upon the amount of tetrafluoroethylene in the copolymer, the solvent used, the concentration of the solution, and the molecular weight and the viscosity of the copolymer. Thus, solutions of copolymers containing high proportions of tetrafluoroethylene and highly concentrated solutions usually gel at higher temperatures than do solutions of lower concentration of copolymers having lower tetrafluoroethylene content. Similarly solutions of copolymer containing high viscosity polymers gel at higher temperatures than do solutions containing lower viscosity polymers. The temperature of gelation can readily be determined by a simple experiment using any given copolymer and latent solvent.

Rapid and vigorous stirring during the cooling step is the preferred method of agitation, although other methods such as shaking or turbulent flow can be used. If agitation is not used during the cooling of solution the product sets into a rather rigid gel.

Any known method of cooling can be used in the present process, so long as it does not interfere with the necessity of subjecting the entire body of liquid to a state of rapid shearing action. Thus, the container for the solution is cooled preferably from the exterior by air or by surrounding it with a bath of liquid to dissipate the heat.

The present process is usually carried out to yield dispersions containing, on the basis of the total weight of the dispersion, at least 10% of the tetrafluoroethylene/ethylene copolymer. The process is of special utility in that dispersions in which this percentage is as high as 50% can be obtained. If desired the dispersions can be modified by the inclusion of such materials as pigments, plasticizers, wax resins, agents to promote adhesions or to facilitate stripping, metal powder, and the like.

These dispersions can be applied in a fluid condition at normal temperature and a product obtained, after removal of the latent solvent, which has properties similar to those of products obtained from hot solutions or melts. This step is a decided advantage in the industrial operation of coating and impregnating which are difficult to carry out at elevated temperature.

The dispersions described herein are useful in the impregnation of paper, fabrics and other porous and semi-porous materials. They are valuable for coating and impregnating glass fabrics, metal surfaces such as copper and for the preparation of unsupported films. They are particularly useful for preparing films, coatings and impregnations where outstanding resistance to heat, chemical agents and electrical stresses or combinations of these are desired. The present dispersions are also valuable for preparing finely divided tetrafluoroethylene/ethylene copolymers which can be isolated from the dispersion by removing the latent solvent.

As many apparently widely different embodiments of this invention may be made without departing from the spirit and scope thereof, it is to be understood that I do not limit myself to the specific embodiments thereof except as defined in the appended claims.

I claim:

1. A process for obtaining a dispersion of tetrafluoroethylene/ethylene copolymer comprising finely divided particles of said copolymer suspended in a liquid organic medium, said process comprising dissolving tetrafluoroethylene/ethylene copolymer containing combined tetrafluoroethylene in major amount up to 85% by weight of said copolymer in an organic liquid which is heated substantially to its boiling point and which boils above 175° C. and which is a solvent for said copolymer at temperatures above 175° C. and a non-solvent for said copolymer below 175° C., maintaining the temperature of the solution at substantially its boiling point until any water contained in the solution is completely removed, cooling the solution slowly to the temperature of incipient gelation, and then while maintaining the solution at said last mentioned temperature vigorously agitating the solution until precipitation of the copolymer in finely divided form is substantially complete, and until said dispersion of the copolymer in said organic liquid is obtained, said organic liquid boiling above 175° C. being a neutral ester of a saturated dicarboxylic acid containing at least 5 carbon atoms, said ester being free of multiple carbon-to-carbon linkages and containing from 7 to 18 carbon atoms.

2. The process set forth in claim 1 in which said liquid organic medium is diisobutyl adipate.

KENNETH L. BERRY.

REFERENCES CITED

The following references are of record in the file of this patent:

UNITED STATES PATENTS

| Number | Name | Date |
|---|---|---|
| 2,384,848 | Peters | Sept. 18, 1945 |
| 2,412,960 | Berry | Dec. 24, 1946 |